United States Patent [19]

Schlieckmann

[11] 4,107,248
[45] Aug. 15, 1978

[54] METHOD FOR THE CONTINUOUS MANUFACTURE OF FOAMED HOLLOW PROFILES

[75] Inventor: Alfred Schlieckmann, Vaterstetten, Germany

[73] Assignee: The Upjohn Company, Kalamazoo, Mich.

[21] Appl. No.: 741,858

[22] Filed: Nov. 15, 1976

Related U.S. Application Data

[62] Division of Ser. No. 615,248, Sep. 22, 1975, Pat. No. 4,021,173.

[30] Foreign Application Priority Data

Oct. 15, 1974 [DE] Fed. Rep. of Germany ....... 2449044

[51] Int. Cl.² .................... B29C 5/10; B29D 23/00; B29D 27/04
[52] U.S. Cl. .................... 264/51; 264/159; 264/214; 264/209; 264/334
[58] Field of Search ........... 264/46.2, 46.4, 46.1, 264/45.8, 209, 173, 138, 334, 45.9, 159, 214, 334; 425/4 C, 817 C, 224, 371, 471, 115, 329, 468

[56] References Cited
U.S. PATENT DOCUMENTS

| | | | |
|---|---|---|---|
| 3,561,048 | 2/1971 | Ernst | 425/4 C |
| 3,566,448 | 3/1971 | Ernst | 264/46.2 |
| 3,585,678 | 6/1971 | Neumann et al. | 425/4 C |

*Primary Examiner*—Willard E. Hoag
*Attorney, Agent, or Firm*—St. Onge, Mayers, Steward & Reens

[57] ABSTRACT

The invention relates to a method for the continuous manufacture of longitudinally slit foam pipes using an internal core and two outer mould portions, externally and spacedly surrounding the core, whereby the two outer mould portions are displaced in movement-conforming manner along a path with the formation of a continuous, annular channel open towards a core support and whereby further a sheet is curved in tubular or U-shaped manner, and just before entering the annular channel is supplied with a foam base material which is completely foamed in the annular channel, whereby the foamed hollow profile is formed.

3 Claims, 4 Drawing Figures

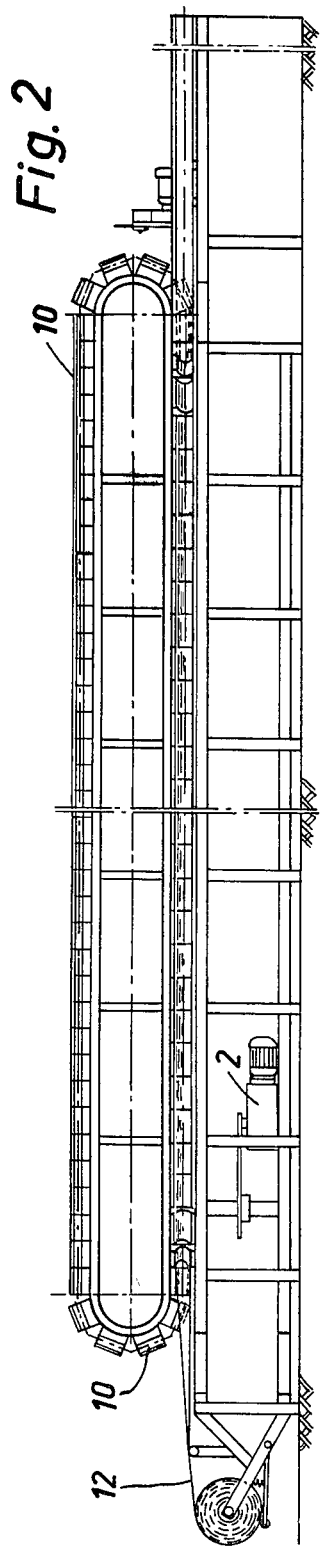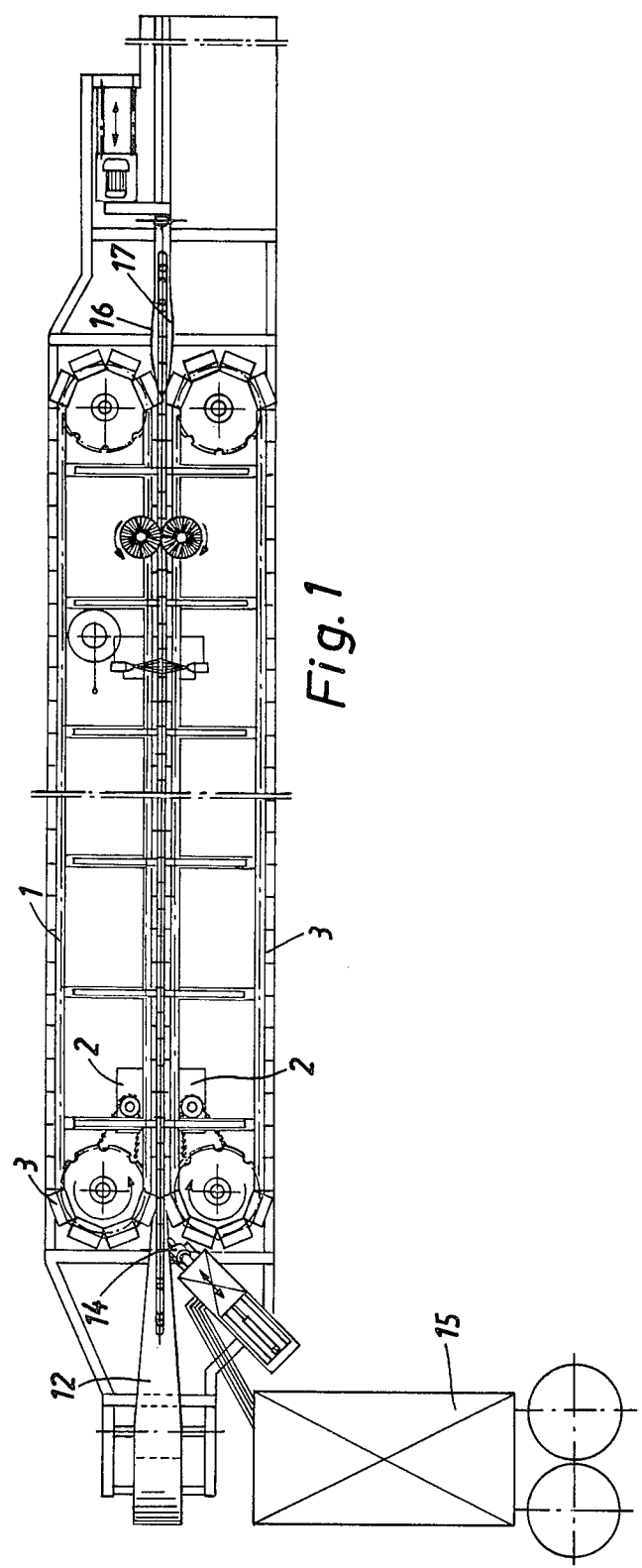

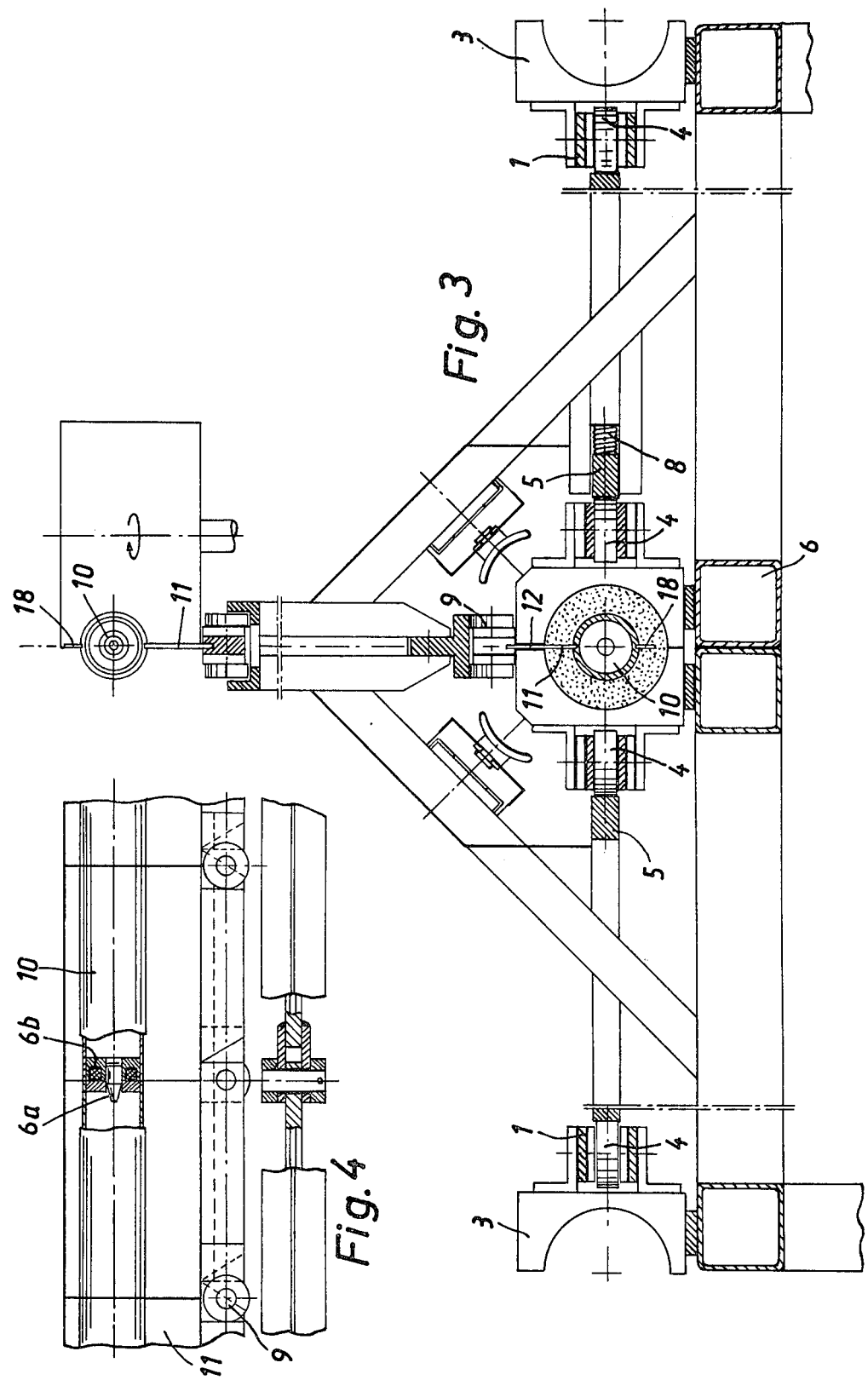

METHOD FOR THE CONTINUOUS MANUFACTURE OF FOAMED HOLLOW PROFILES

BACKGROUND OF THE INVENTION

Foamed hollow profiles are used more particularly as foam insulating pipes and more specifically for the thermal insulation of radiator pipes. For the continuous manufacture of foam insulating pipes a method is known in which a foam base material is applied to a rotating and longitudinally moved core member, whereby the said material can freely foam up towards the outside because in this direction no limit is provided. This has the disadvantage that foam insulating pipes produced in this way have an irregular outer surface and also they have to be covered with an additional enveloping foil when fitted to a radiator pipe. An additional disadvantage is that the wall thickness of the foam pipe is irregular.

An apparatus is also known wherein a fixed outer moulding pipe which is slitted at the top is provided, through whose longitudinal slot via a flat bridge a cylindrical rod is concentrically introduced in such a way that an annular channel is formed, interrupted at the top by the bridge. At either side of the bridge the edges of an inner and outer sheet necessary for pipe manufacture are passed upwardly out of the outer moulding pipe where they are pressed against the bridge by two transfer chains and moved in the longitudinal direction. Prior to the two sheets entering the moulding channel the U-shaped pre-curved outer sheet is supplied with a foam mixture. The foam mixture foams on passage through the annular moulding channel and fills the annular moulding channel on pressing the outer sheet against the inner wall of the outer moulding pipe and pressing the inner sheet against the cylindrical core. On leaving the moulding channel the excess, outwardly projecting sheet edges are cut off and the thus finished pipe strand is cut to length. A particular disadvantage of this manufacturing method is the pronounced friction between the outer sheet and the outer mould, which limits both the length of the apparatus and consequently the manufacturing speed and the number of possible materials which can be used, because high-grade foams produce higher reaction pressures during foaming. However, the upward limit of these reaction pressures is limited because as a result there is a simultaneous and very pronounced increase in friction. A further disadvantage results from the fact that a random construction of the core is not possible. A further disadvantage is that in addition to the outer sheet an inner sheet must be used which must also be provided on its side facing the core with a lubricant in order to keep friction within limits. The inner sheet is merely a manufacturing aid because it is unnecessary for the subsequent use of the foam pipe as an insulating pipe. Furthermore, the inner sheet unnecessarily complicates the manufacturing process and makes the whole installation more fault-prone.

From U.S. Pat. No. 3,585,678 a continuous process is also known wherein once again an outer and an inner sheet are required for the manufacture of a longitudinally slit foam insulating pipe. Both sheets, accompanied by tubular cambering, are introduced into an annular moulding channel, which is radially interrupted at one peripheral point over its length in such a way that the outer sheet engages on the outer wall and the inner sheet on the inner wall formed by the core, whereby shortly before the sheets are introduced into the moulding channel, reactive foam base material is filled into the outer sheet which then completely foams in the moulding channel and is joined to the two sheets. The moulding channel is hereby formed by two outer mould chains and the fixed core secured to a bridge, which is upwardly passed out of the two outer mould chains by an upper parting line. This known process also suffers from the disadvantage of having an additional inner sheet. However, it more particularly suffers from the additional disadvantage that very strong frictional forces occur on the outer wall of the fixed core, so that here again there are limitations with this process regarding the working speed, the cross-section of the articles being produced and the usability of different foam materials.

The same applies regarding another known installation having a fixed mandrel as the inner core, which is secured at the inlet to the installation and projects freely into the fixed or rotary outer mould. Here again an inner sheet is necessary, so that considerable difficulties result from the problems due to friction which cannot be avoided by the use of additional lubricants. Furthermore, it has the additional disadvantage that the mandrel which is only secured on one side does not have an adequate stability to absorb the pressures which occur during foaming without any deflection thereof.

Therefore, due to the above-mentioned problem of mandrel deflection, in the installation known from DAS 2,165,584 the proposal is made to control the deflection by means of a laser beam and to correct the alignment by means of regulating and control members. However, this auxiliary equipment does not lead to a perfect alignment of the fixed inner core and at the same time the whole installation becomes relatively complicated.

Similar problems occur with the installation known from Belgian Pat. No. 670,948, whereby the outer circumference of a cylindrical rod is coated with a polyurethane film. The rod is then passed through a fixed cylindrical outer mould which has a cylindrical shape and configuration. At the same speed as the rod one side of an endless sheet is passed through the fixed mould and which is also cylindrically folded within the cylindrical mould and engages on the outer wall of the latter. To reduce friction the rod and endless sheet are passed through the fixed cylindrical mould at the same speed. Nevertheless the disadvantage still occurs of considerable friction between the endless sheet and the inner wall of the fixed cylindrical mould.

Before the inlet to the fixed cylindrical mould polyurethane is applied to the endless sheet which is folded at this point. The polyurethane then foams completely within the annular space in the fixed cylindrical mould so that the rod leaves the fixed cylindrical mould with a polyurethane foam covering. At this point the endless sheet is folded back into the planar shape and configuration and is returned via guide rollers as an endless band to the inlet of the apparatus.

Apart from the above-mentioned disadvantage of high friction, there is also more particularly the disadvantage that hollow profiles cannot be made because it is only possible to provide a rod with a firmly adhering polyurethane foam covering. There is also no possibility of additionally covering the polyurethane foam with a film, which is, for example, sometimes desired for insulating materials because the foil used comprises an endless, constantly reused conveyor belt.

From U.S. Pat. No. 3,566,448 a process and apparatus for the continuous manufacture of foam profiles, particularly with a polyurethane base is known, which also has the disadvantage that hollow profiles cannot be made which have a substantially closed annular cross-section. In the known apparatus two conveyor belts are juxtaposed, having in each case mould halves which engage against or within one another and form a moulding channel, whose cross-section is semi-cylindrical. If the cross-section of this approximately rod-shaped profile has a somewhat complicated shaping, for example, undercuts, a third conveyor belt can be provided for facilitating the detachment of the conveyor belts from the foam profile.

As the conveyor belts revolve synchronously at the same speed, friction can be kept relatively low. However, this known installation still has the disadvantage of not providing the possibility of manufacturing hollow profiles with an approximately closed annular cross-section, because the profiles have in fact a semi-cylindrical or optionally a rectangular cross-section. It is impossible to make approximately closed cylindrical hollow profiles because only external mould chains are provided, i.e. there is no inner chain. According to a special embodiment, between the two mould halves a core cord with spacers is introduced, but this still does not permit the manfacture of a substantially closed hollow cylindrical profile. Furthermore, it is relatively complicated to remove the core cord from the polyurethane foam profile after the manufacture thereof, because for this purpose the spacers must be separated from the core cord. The further disadvantage exists that the spacers cannot be removed from the polyurethane foam profile but must remain therein. This leads to the disadvantage that at the apparatus inlet the core cord must be continually provided with new spacers. Furthermore, due to the use of the naturally relatively thin core cord, it is not possible to produce a cavity with a relatively large radius. Furthermore, the shaping of the cavity is very imprecise due to the flexibility of the core cord and the incomplete support provided by the spacers. In addition there is no possibility of providing a protective covering on the outer periphery of the insulation which is often desired for insulating pipes.

SUMMARY OF THE INVENTION

Therefore, on the basis of the prior art of U.S. Pat. No. 3,585,678 the problem of the present invention is to improve the continuous manufacture of longitudinally slit foam pipes, in such a way that the hitherto unavoidable friction is prevented and the working speed is increased. According to the invention this problem is solved in that the core is displaced in movement-conforming manner along the path with the two coaxial outer mould portions.

The apparatus according to the invention for performing this process is characterised in that, in the central plane and perpendicular to the movement path plane of the two outer mould portions, a rotating endless conveying member is provided, which carries an articulately segmented core and is displaced in movement-conforming manner with the two outer mould portions.

Therefore, according to the invention the two outer mould portions and the core positioned coaxially thereto move in movement conforming manner relative to one another so that there is no relative motion with reference to the foam pipe and therefore frictional forces are avoided. Furthermore, the hitherto necessary inner sheet becomes superfluous. It is obvious that according to the invention much higher working speeds are possible than hitherto due to the avoidance of relative motion and frictional forces. There are also no restrictions regarding the cross-sectional configuration of the foam pipe and the selection of the foam materials.

According to a preferred embodiment the core comprises individual shaped members fixed by bridges to an endless chain, which forms the endless rotating conveying member, driven either by a separate synchronous drive or by the outer mould portions, which are also fixed to rotating endless chains.

The invention is now explained in greater detail relative to an embodiment with reference to the drawings, wherein show:

FIG. 1 a plan view of the whole apparatus;
FIG. 2 a side view of the whole apparatus;
FIG. 3 an enlarged cross-section through the apparatus;
FIG. 4 a partial side view (partly cut away) of the core with its related chain.

As can best be seen from the plan view of FIG. 1, two juxtaposed, endless rotating outer mould chains 1 are provided which are in each case driven by a motor with a gear 2 and are horizontally displaced along a rectilinear path in movement-conforming manner i.e. at the same speed.

The two outer mould chains 1 are provided with a plurality of directly juxtaposed, complementary, interchangeable outer mould halves 3, having in each case semi-cylindrical recesses, whereby two directly facing outer mould halves form, when travelling along the rectilinear movement path, a cylindrical recess. As explained in greater detail hereinafter relative to the core the complementary mold portions, which have a parting plane along which they are separable, are so formed in that parting plane as to provide a diametrically oriented gap extending longitudinally along a wall of the cylindrical recess formed by the outer mold partions, so as to provide lateral access for supporting the core within the recess. As best seen in FIG. 3, the open center, i.e. the cylindrical recess, is of substantially greater cross section than the width of the gap. Furthermore, along the rectilinear movement path, all the outer mould halves 3 are joined together in seamless manner in the area of their ends, whereby a continuous channel is formed.

The two outer mould chains 1 rotating in the horizontal plane are provided along their entire extent with rolls 4, supported on horizontal fillets 5 on either side of the outer mould halves 3. The fillets 5 are in turn supported (not shown) on a support 6 of the apparatus. Furthermore, one of the two fillets 5 (to the right in FIG. 3) is horizontally slidingly mounted and supported on horizontal compression springs 8, so that in each case two facing outer mould halves 3 can be pressed against one another in resilient manner.

A further rotating chain (core chain) 9 is positioned in the vertical central plane, i.e. axially relative to the two outer mould chains 1 and is positioned above the latter in such a way that its centre coincides with the parting plane of the outer mould halves 3, while the latter are traversing the aforesaid predetermined rectilinear movement path. In much the same way as with the two outer mould chains 1 on the outer periphery of core chain 9, a plurality of core shaped members 10 are arranged in articulately segmented fashion along the entire chain periphery in interchangeable manner. The connection between core members 10 and the actual chain takes place via associated bridges 11 which provides supporting connection between the core members and chain 9. Bridges 11 are secured in the parting plane between the outer mould halves 3 forming the gap mentioned hereinbefore in such a way that the core members 10 are located precisely coaxially to the two outer mould halves 3, so that a continuous annular hollow body is formed which forms the mould cavity for the complete foaming and curing of the foam material.

Core chain 9 with its associated core members 10 is driven synchronously and in movement-conforming manner with the two outer mould chains 1. Either a separate synchronous drive can be provided or a drive can simply be provided by the two outer mould chains 1, because the bridges 11 are secured in the upper parting plane of the outer mould halves 3. Thus, there is no relative movement between the outer mould halves 3 and the core members 10, i.e. the outer mould halves 3 and the core members 10 form a continuous annular moving body.

In the same way as with the outer mould halves 3, the core members 10 are contiguous with one another at their ends so that a closed core strand is formed. In order to increase the strength and for centering purposes, centering pins 6a and magnets 6b are provided at the said ends.

As can be gathered from FIGS. 1 and 2 a facing sheet 12 is drawn from a roll and, by means of U-shaped pre-shaping members (not shown) is given a U-shape and is then introduced into the inlet of the mould comprising outer mould halves 3 and core members 10 in such a way that the two edges of sheet 12 engage on the outer edge of core chain 9. Furthermore, in the vicinity of the inlet to the mould channel a metering device 15 with a discharge member 14 is provided, so that the cavity of the U-shaped sheet 12 is supplied with a foam mixture. This foam mixture then foams and hardens within the continuous mould channel formed by outer mould halves 3 and core members 10. Thus, an annular hollow body interrupted by the bridges 11 is formed, having the shape of a pipe slitted on one side. Sheet 12 is secured in the area of the parting line between the outer mould halves 3 and the bridges 11, whereby the width of sheet 12 is selected in such a way that it seals in an approximately flush manner the upper edge of the outer mould halves.

At the outlet end of the moving mould, which coincides with the end of the predetermined path of travel of the moulding members in closed complementary relation, the foam pipe or strand is discharged as the moulding channel is opened by passage of the three conveyor chains around their respective return sprokets. At this point, the foam pipe is also partially opened by engagement with stationary camming means located on the conveyor which enter into the longitudinal slit of the pipe as it is advanced. For this purpose, two fixed expanding wedges 16 and 17, arranged on either side of the bridges 11 as seen in FIG. 1 engage in the parting line in such a way that on reversing the core chain 9 in the area of the guide roll, core members 10 and bridges 11 can without difficulty be removed upwardly from the foam pipe. As the outer periphery of the core shaped members 10 is provided with blade-like fillets 18 directly opposite bridges 11, a further parting line is formed in the foam pipe, directly opposite the first-mentioned parting line. As a result of this additional parting line, during the expanding process the foam pipe is subdivided into two semi-cylindrical shells which are joined together by sheet 12 in the area of the lower parting line. This leads to the advantage that the assembly of the foam insulating pipe on a radiator pipe or the like is extremely easy because it is merely necessary to place the two semi-cylindrical shells on either side of the radiator pipe.

Since, according to the invention, relative movement between the foam and between the outer mould halves 3 and the core shaped members 10 is avoided, no friction occurs and even high foaming pressures can without difficulty be absorbed, so that there is substantially no limitation on the selection of the foam materials. There is also no restriction regarding the cross-sections of the foam pipes. Apart from the relatively large wall thicknesses, if necessary pipes can be made whose cross-sections vary in the longitudinal direction of the pipe. A further advantage is the considerable increase in the working speed.

I claim:

1. The method of continuously manufacturing a foam pipe or annulus having a diametrically oriented slit extending longitudinally along its wall to give lateral access to an open center of substantially greater cross section than the width of the slit, which method comprises providing an articulated segmented internal core of suitable cross section to form said open center of said foam pipe, and a paired series of complementary outer mould portions externally and spacedly surrounding said core to define the annulus, said complementary mould portions having a parting plane along which they are separable and being formed in said plane to define a gap coincident with said diametrically oriented slit of said foam pipe, displacing said paired series in movement-conforming manner along a predetermined rectilinear path of travel while maintaining the respective outer mould portions in closed complementary relation whereby to form a moving moulding channel having said diametrically oriented gap extending lontiguidinally in said parting planes coextensive with said predetermined path, providing a support externally of said mould portions, and supporting said core segments within said channel from said support by bridge elements which extend into said diametrically oriented gap and substantially close same and dispose said segmented core substantially axially of said moulding channel, advancing said core support means along said predetermined path in movement-conforming manner concomitantly with said outer mould portions to produce a continuous moving moulding channel of open-ended annular configuration and to avoid substantial relative motion between said internal core and outer mould portions, advancing a carrier sheet continuously into said moulding channel inlet and depositing a self-rising foam mix on said sheet ahead of said inlet, folding the lateral edges of said carrier sheet upwardly to conform it generally with the outer annular moulding surface with said edges extending outwardly through said diametrically oriented longitudinal gap on opposite sides of said core-supporting bridge elements to fully close said gap, and allowing said foam mix to rise and fill said moulding channel and encase said concomitantly advancing core means during advance along said predetermined path.

2. The method as defined in claim 1, wherein said core segments are formed to provide blade-like fillets diametrically opposite said bridge elements in said parting plane, whereby to form a corresponding slit internally along said foam pipe.

3. The method as defined in claim 1, which further includes the step of wedging open said longitudinal slit in said foam pipe as the pipe emerges from the moulding channel, whereby to facilitate separation of said core segments from the pipe as it is being continuously advanced.

* * * * *